United States Patent
Yoshiya

(10) Patent No.: US 10,352,681 B2
(45) Date of Patent: Jul. 16, 2019

(54) DISPLACEMENT DETECTION DEVICE

(71) Applicants: MELEXIS TECHNOLOGIES NV, Tessenderlo (BE); K. K. MELEXIS JAPAN TECHNICAL RESEARCH CENTER, Yokohama-shi, Kanagawa (JP)

(72) Inventor: Takumi Yoshiya, Yokohama (JP)

(73) Assignee: MELEXIS TECHNOLOGIES SA, Bevaix (CH)

( * ) Notice: Subject to any disclaimer, the term of this patent is extended or adjusted under 35 U.S.C. 154(b) by 50 days.

(21) Appl. No.: 15/546,789

(22) PCT Filed: Jan. 28, 2016

(86) PCT No.: PCT/JP2016/052527
§ 371 (c)(1),
(2) Date: Jul. 27, 2017

(87) PCT Pub. No.: WO2016/121884
PCT Pub. Date: Aug. 4, 2016

(65) Prior Publication Data
US 2018/0017369 A1    Jan. 18, 2018

(30) Foreign Application Priority Data

Jan. 29, 2015 (JP) ................................. 2015-015061

(51) Int. Cl.
*G01B 7/02* (2006.01)
*F02M 51/06* (2006.01)
(Continued)

(52) U.S. Cl.
CPC ........... *G01B 7/023* (2013.01); *F02M 57/005* (2013.01); *F02M 65/00* (2013.01); *G01B 7/004* (2013.01);
(Continued)

(58) Field of Classification Search
CPC ........ G01B 7/023; G01B 7/00; F02M 57/005; F02M 65/00; F02M 65/005;
(Continued)

(56) References Cited

U.S. PATENT DOCUMENTS 5,299,451 A * 4/1994 Brosse ................... G01D 5/147
324/207.2
5,573,088 A * 11/1996 Daniels ..................... F16F 9/22
188/267

(Continued)

FOREIGN PATENT DOCUMENTS

EP      2117026 A1   11/2009
JP      59-168381 A   9/1984
(Continued)

OTHER PUBLICATIONS

Japanese Office Action issued by JPO to the corresponding Japanese application No. 2015-015061 dated Oct. 4, 2017, citing the above references.

(Continued)

*Primary Examiner* — Melissa J Koval
*Assistant Examiner* — Rahul Maini
(74) *Attorney, Agent, or Firm* — Hauptman Ham, LLP

(57) ABSTRACT

To provide a displacement detection device that detects a displacement of a measuring object housed in a casing without changing the design of the casing or while suppressing the design change of the casing.
A displacement detection device includes a pair of magnets arranged outside an injector body housing a needle with a space between the magnets and forming a magnetic field in the space, a soft magnetic material connected to the needle inside the injector body and displaced in accordance with the displacement of the needle and disposed in the magnetic field formed by the pair of magnets, and a sensor disposed (Continued)

outside the injector body and in the magnetic field formed by the pair of magnets, and detecting a change in magnetic flux density in accordance with the displacement of the soft magnetic material.

20 Claims, 14 Drawing Sheets

(51) Int. Cl.
    *F02M 57/00*     (2006.01)
    *F02M 65/00*     (2006.01)
    *G01B 7/004*     (2006.01)

(52) U.S. Cl.
    CPC ....... *F02M 51/0653* (2013.01); *F02M 65/005* (2013.01); *F02M 2200/242* (2013.01); *F02M 2200/245* (2013.01)

(58) Field of Classification Search
    CPC ......... F02M 51/0653; F02M 2200/242; F02M 2200/245; F15B 13/0402; F15B 15/2807
    USPC .................................................. 324/207.13
    See application file for complete search history.

(56) References Cited

U.S. PATENT DOCUMENTS

| | | | | |
|---|---|---|---|---|
| 8,237,430 B2* | 8/2012 | Thode | ................... | G01D 5/147 324/207.24 |
| 8,829,893 B2* | 9/2014 | Youngner | .............. | G01D 5/145 324/207.24 |
| 9,933,282 B2* | 4/2018 | Tekin | ..................... | G01D 5/145 |
| 2003/0030431 A1* | 2/2003 | Reininger | .............. | G01D 5/145 324/207.24 |
| 2009/0278641 A1* | 11/2009 | Hedayat | ................. | G01B 7/003 335/284 |
| 2011/0273166 A1* | 11/2011 | Salt | ........................ | G01D 5/147 324/207.24 |

FOREIGN PATENT DOCUMENTS

| | | |
|---|---|---|
| JP | S59-168381 A | 9/1984 |
| JP | 2003-120393 A | 4/2003 |
| JP | 2011-231696 A | 11/2011 |
| JP | 2014-95615 A | 5/2014 |
| WO | 2008105228 A1 | 9/2008 |

OTHER PUBLICATIONS

"Dictionary of Metallic Materials;" published by Asakura Book Store, Inc.,Oct. 25, 1997, p. 305, with partial English translation, cited in the above Japanese Office Action.

"Science Time-line;" published by Maruzen, Inc.,Nov. 30, 2005, p. 415, with partial English translation, cited in the above Japanese Office Action.

International Search Report dated Apr. 26, 2016, for PCT/JP2016/052527, citing the above reference(s).

* cited by examiner

FIG. 3A    FIG. 3B    FIG. 3C
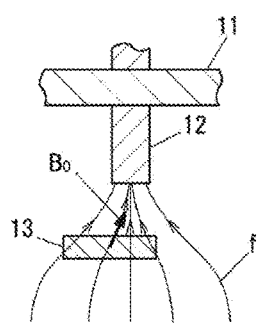
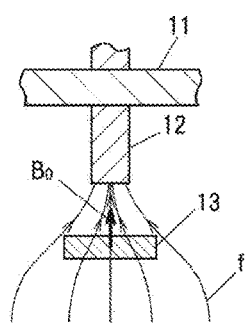
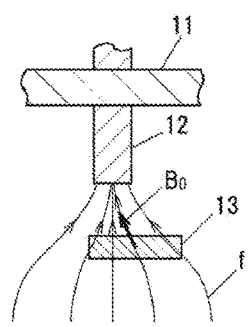
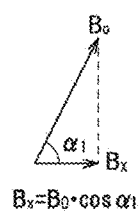
$B_x = B_0 \cdot \cos \alpha_1$
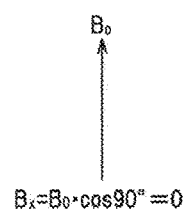
$B_x = B_0 \cdot \cos 90° = 0$
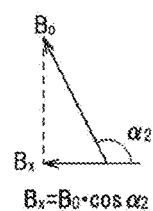
$B_x = B_0 \cdot \cos \alpha_2$ FIG. 9A  FIG. 9B  FIG. 9C
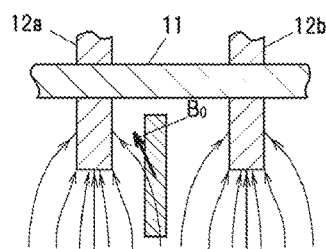
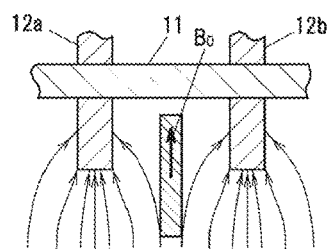
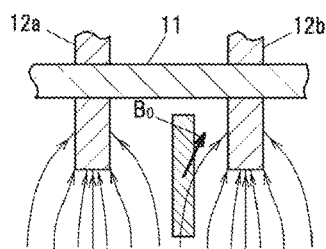
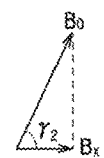

DISPLACEMENT DETECTION DEVICE

CROSS REFERENCE TO RELATED APPLICATION

This application claims the priority of Japanese Patent Application No. 2015-015061 filed on Jan. 29, 2015, in the JPO (Japanese Patent Office). Further, this application is the National Phase application of International Application No. PCT/JP2016/052527 filed Jan. 28, 2016, which designates the United States and was published in Japan. Two of the priority documents are hereby incorporated by reference in their entireties.

TECHNICAL FIELD

The present invention relates to a displacement detection device.

BACKGROUND ART

As a conventional technique, a displacement detection device for detecting a displacement of a needle of an injector has been proposed (see, for example, Patent Literature 1).

The displacement detection device disclosed in Patent Literature 1 is a lift sensor that is provided inside an injector body of the injector and detects the displacement of the needle. The injector includes an injector body having a fuel passage therein, a needle provided in the passage of the injector body, and a solenoid coil applying force to push and pull the needle, and a tip portion of the needle comes in contact with a seam near a fuel nozzle hole on an inner wall of the injector body to close the nozzle hole and separates from the seam to open the nozzle hole. The displacement detection device has a sensor plate that moves together with the needle and a gap sensor that detects a gap between the gap sensor and the sensor plate, and detects the displacement of the needle by detecting the gap with the sensor plate by the gap sensor.

CITATION LIST

Patent Literature

Patent Literature 1: JP 2003-120393 A

SUMMARY OF INVENTION

Technical Problem

However, the displacement detection device disclosed in Patent Literature 1 needs to be incorporated inside the injector, and thus it is necessary to design a dedicated injector body. Even when the gap sensor and the sensor plate are provided outside the injector body, there is still a problem that the injector body needs to be designed at least in accordance with the shape of the connecting portion between the sensor plate and the needle in order to move the sensor plate together with the needle and the sensor plate cannot be attached to an existing injector body.

Accordingly, an object of the present invention is to provide a displacement detection device that detects a displacement of a measuring object housed in a casing without changing the design of the casing or while suppressing the design change of the casing.

Solution to Problem

An aspect of the present invention is to provide a following displacement detection device to achieve the above object.

[1] A displacement detection device including:
a magnet which is located outside a casing that houses a measuring object and which forms a magnetic field inside the casing;
a soft magnetic material which is connected to the measuring object inside the casing and displaced in accordance with displacement of the measuring object and which is disposed in the magnetic field formed by the magnet; and
a sensor which is disposed outside the casing and in a magnetic field formed by the magnet and which is configured to detect a change in magnetic flux density due to displacement of the soft magnetic material.

[2] The displacement detection device according to the [1], wherein the casing is made of a non-magnetic material.

[3] The displacement detection device according to the [1] or [2], wherein the soft magnetic material is displaced within a range in which a magnetic flux passing through the soft magnetic material does not change.

[4] A displacement detection device including:
a magnet which is displaced while being connected to a measuring object housed inside a casing; and
a sensor which is located outside the casing and which is configured to detect a change in magnetic flux density due to displacement of the magnet.

[5] The displacement detection device according to any one of the [1] to [4], wherein the measuring object is a needle of an injector, and the casing is a body of the injector.

Advantageous Effects of Invention

According to the invention of claim 1 or 4, the displacement of the measuring object housed in the casing can be detected without changing the design of the casing or while suppressing the design change of the casing.

According to the invention of claim 2, with respect to the non-magnetic casing, the displacement of the measuring object housed in the casing can be detected without changing the design of the casing or while suppressing the design change of the casing.

According to the invention of claim 3, hysteresis of the soft magnetic material can be suppressed.

According to the invention of claim 5, the displacement of the needle in the injector body can be detected without changing the design of the injector body or while suppressing the design change of the injector body.

BRIEF DESCRIPTION OF DRAWINGS

FIG. 3A is a schematic diagram for illustrating an operation of the displacement detection device.

FIG. 3B is a schematic diagram for illustrating the operation of the displacement detection device.

FIG. 3C is a schematic diagram for illustrating the operation of the displacement detection device.

FIG. 9A is a schematic diagram for illustrating an operation of the displacement detection device.

FIG. 9B is a schematic diagram for illustrating the operation of the displacement detection device.

FIG. 9C is a schematic diagram for illustrating the operation of the displacement detection device.

DESCRIPTION OF EMBODIMENTS

First Embodiment (Configuration of Injector)

Figure 1:
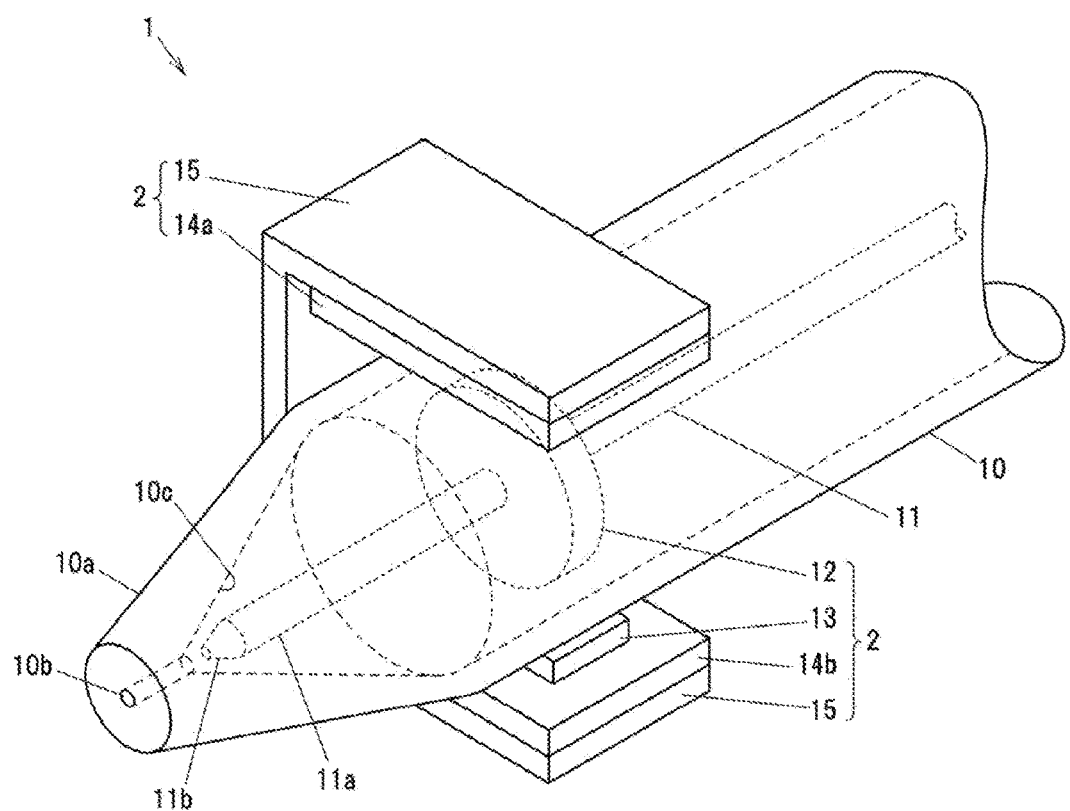
FIG. 1 is a perspective view showing a configuration example of an injector and a displacement detection device according to a first embodiment.
Figure 2:
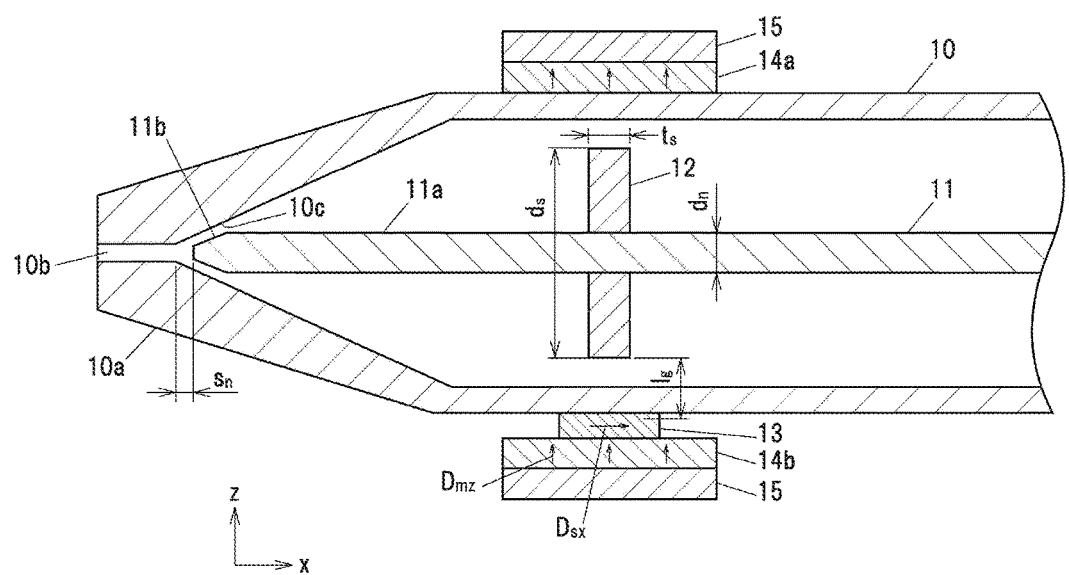
FIG. 2 is a cross-sectional view showing the configuration example of the injector and the displacement detection device according to the first embodiment.

FIG. 1 is a perspective view showing a configuration example of an injector and a displacement detection device according to a first embodiment. FIG. 2 is a cross-sectional view showing a configuration example of the injector and the displacement detection device according to the first embodiment. FIG. 2 is a cross sectional view of the injector taken along a plane parallel to the zx plane and passing through the axial center of a needle 11, assuming that the vertical direction is the z-axis direction, the horizontal direction is the x-axis direction, and the depth direction is the y-axis direction. FIGS. 14A to 14D are perspective views showing a configuration example of the sensor.

An injector 1 has an injector body 10 as a casing having a fuel flow path inside and the needle 11 as a measuring object provided in a fuel flowpath of the injector body 10. The injector body 10 has a nozzle portion 10a of which the diameter decreases toward the tip, and a nozzle hole 10b for injecting fuel from the inside to the tip of the nozzle portion 10a. Further, a seam portion 10c of the injector body 10 is a portion corresponding to the nozzle portion 10a of the inner wall of the injector body 10 and formed in a conical shape.

The needle 11 has a columnar portion 11a formed on a column and a tip portion 11b formed in a conical shape continuously from the columnar portion 11a toward the tip. It is natural that the seam portion 10c of the injector body 10 and the tip portion 11b of the needle 11 should be processed so as to be in close contact with each other by shape matching. A magnet and a solenoid coil (not shown) are provided at the other end of the needle 11 on the side opposite to the tip portion 11b, and force for pushing and pulling the needle 11 in the x-axis direction is applied to displace the needle 11 to make a stroke in the x direction The current of the solenoid coil provided at the other end of the needle 11 is controlled so that the tip portion 11a of the needle 11 comes into contact with the seam portion 10c to close the nozzle hole 10b and separates from the seam portion 10c to open the nozzle hole 10b. A predetermined pressure is applied to the fuel filling the injector body 10, and when the nozzle hole 10b is opened, the fuel is injected from the nozzle hole 10b to the outside of the injector body 10 according to the degree of the opening.

A displacement detection device 2 includes a soft magnetic material 12 that moves together with the needle 11 in the x-axis direction, a sensor 13 that detects a magnetic flux density changing based on the displacement of the soft magnetic material 12 in the detecting direction $D_{sx}$ and outputs a voltage corresponding to the magnetic flux density, a pair of magnets 14a and 14b provided so as to be magnetized in a magnetizing direction $D_{mz}$ orthogonal to the detecting direction $D_{sx}$ and so that the injector body 10 is sandwiched between the pair of magnets 14a and 14b, and a yoke 15 provided in order to form a uniform magnetic field between the magnets 14a and 14b. The output of the sensor 13 is relayed to an ECU (not shown) or the like, and the output value is used for feedback or the like for stroke control of the needle 11.

Figure 14A:
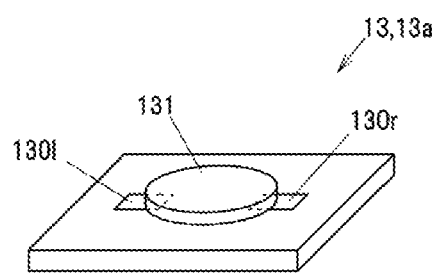
FIG. 14A is a perspective view showing a configuration example of the sensor.

As shown in FIG. 14A, the sensor 13 is, as an example, a Hall IC that has a flat plate shape having a thickness in the z direction and has a detection surface parallel to the xy plane for detecting magnetism in the detecting direction $D_{sx}$, by having at least a pair of Hall elements 130*l* and 130*r* of which the detecting direction is $D_{sz}$ as a magnetic detection element and a magnetic concentrator 131 which is provided on the pair of Hall elements 130*l* and 130*r* and converts the magnetic flux in the x direction into that in the z direction and allows the Hall elements 130*l* and 130*r* to detect the magnetic flux (for example, MLX91208CAH or the like can be used and an output proportional to the magnetic flux density in $D_{sx}$ can be obtained by procuring the difference between the outputs of the Hall elements 130*l* and 130*r*). In addition, if the detecting direction is $D_{sx}$, other kinds of elements such as an MR element or the like may be used for the sensor 13, and a multiaxial magnetism detection IC may be used in which magnetic detection elements are arranged in a plurality of axial directions if the plurality of axial directions include the detecting direction $D_{sx}$. Further, the sensitivity can be improved compared with the sensor 13 by employing a sensor 13d in which the interval between the Hall elements 130l and 130r is narrowed and the magnetic concentrators 131l and 131r are provided at both ends, as shown in FIG. 14D. Further, as in a sensor 13b shown in FIG. 14B, the magnetic concentrator 131 may be omitted from the sensor 13, and the position or displacement of the soft magnetic material 12 may be detected from the difference between the outputs of the pair of Hall elements 130l and 130r.

The soft magnetic material 12 is a flat plate using a soft magnetic material such as iron having a thickness in the x direction, and is disposed between the pair of magnets 14a and 14b, being displaced within a range in which the magnetic flux induced by the soft magnetic material 12 is detected by the sensor 13.

In addition, as the needle 11 moves, the soft magnetic material 12 is displaced in the x direction in accordance with the displacement. The displacement amount $s_n$ is set as a minute displacement of about several millimeters (for example, ±0.5 mm). The soft magnetic material 12 may be formed integrally with the needle 11.

The pair of magnets 14a and 14b are permanent magnets formed using materials such as ferrite, samarium cobalt, neodymium, and form a uniform magnetic field at least in the movable range of the soft magnetic material 12, and magnetic flux induced by the soft magnetic material 12 is ensured so as not to fluctuate toward the plus and minus sides or not to change the numerical value significantly enough to cause influence of hysteresis. As an example, the fluctuation width of the magnetic flux density induced by the soft magnetic material 12 is set to about ±10 mT.

As the yoke 15, iron can be used for example, and other soft magnetic material such as permalloy can be used. It should be noted that the yoke 15 may be omitted when the conditions can be satisfied only with the magnets 14a and 14b. For the injector body 10, stainless steel is used for example, and a non-magnetic material such as aluminum or brass can be used.

The size of the injector 1 is as follows as an example, but can be changed according to the design as appropriate. The outer shape of the injector body 10 is 15 mm, the inner diameter is 12 mm, and the diameter of the nozzle hole 10b is 1 mm. The diameter $d_n$ of the needle is 3 mm and the stroke $s_n$ is ±0.5 mm.

Further, the size of the displacement detection device 2 is as follows as an example, but can be changed according to the design as appropriate. The thickness $t_s$ of the soft magnetic material 12 is 2 mm, the diameter $d_s$ is 5 mm, and the air gap $l_g$ between the soft magnetic material 12 and the detection surface of the sensor 13 is 1 mm. The widths of the magnets 14a and 14b in the x direction are 10 mm, the depth in the y direction is 5 mm, and the thickness in the z direction is 5 mm. The yoke 15 is provided in such a size as to cover at least the magnets 14a and 14b, the width in the x direction is 10 mm, the depth in the y direction is 17 mm, the thickness in the z direction is 2 mm, and the interval in the z direction is 27 mm.

(Operation of Displacement Detection Device)

Next, the operation of the first embodiment will be described with reference to FIGS. 1 to 4.

FIGS. 3A to 3C are schematic views for illustrating the operation of the displacement detection device 2.

When the needle 11 is displaced in the positive direction of the x direction in order to eject fuel from the nozzle hole 10b, the soft magnetic material 12 is displaced in the same manner, and the magnetic flux density $B_x$ in the detecting direction $D_{sx}$ of the magnetic flux density B passing through the Hall element of the sensor 13 has a positive value satisfying $B_x = B_0 \cdot \cos \alpha_1 > 0$ as shown in FIG. 3A, assuming that the angle formed by the x direction and the magnetic flux is $\alpha_1$.

Next, when the needle 11 is displaced in the negative direction of the x direction in order to suppress the amount of fuel injected from the nozzle hole 10b from the state shown in FIG. 3A, the sensor 13 and the soft magnetic material 12 come closest to each other at a certain point, as shown in FIG. 3B. In this state, the magnetic flux density in the detecting direction $D_{sx}$ of the magnetic flux density B passing through the Hall element of the sensor 13 satisfies $B_x = B_0 \cdot \cos 90° = 0$.

Next, when the needle 11 is displaced in the negative direction of x direction in order to prevent the fuel from being ejected from the nozzle hole 10b from the state shown in FIG. 3B, the magnetic flux density $B_x$ in the detecting direction $D_{sx}$ of the magnetic flux density B penetrating the Hall element of the sensor 13 has a negative value satisfying $B_x = B_0 \cdot \cos \alpha_2 < 0$ as shown in FIG. 3C, assuming that the angle between the x direction and the magnetic flux is $\alpha_2$.

Figure 4:
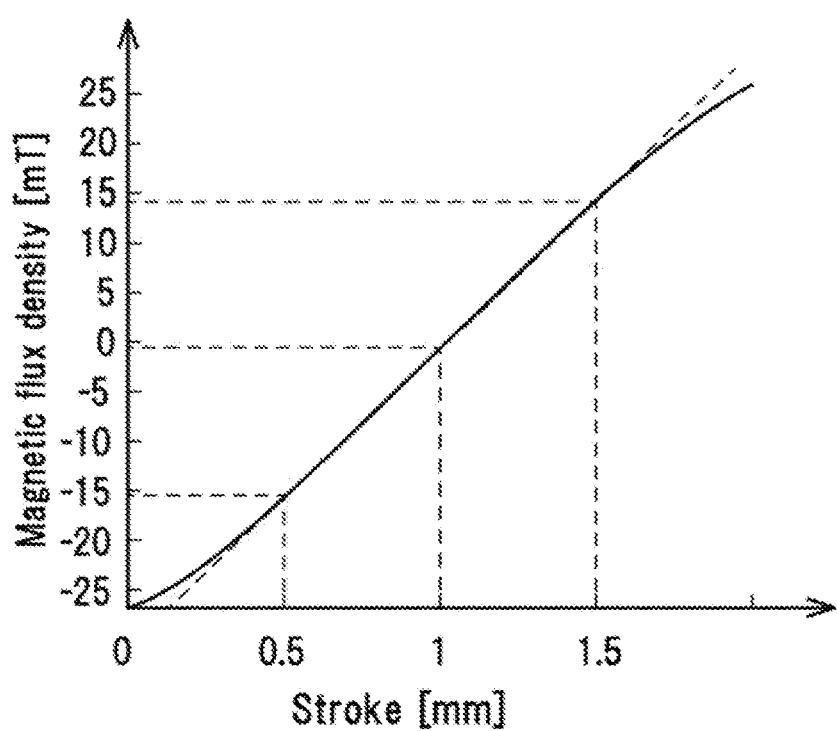
FIG. 4 is a graph showing a relationship between displacement of a soft magnetic material and magnetic flux density detected by a sensor.

The relationship between the displacement of these soft magnetic materials 12 and the magnetic flux density detected by the sensor 13 is represented as shown in FIG. 4 described below. Since the magnetic flux density detected by the sensor 13 is proportional to the output of the sensor 13, the relationship between the displacement of the soft magnetic material 12 and the output of the sensor 13 is also similar to in FIG. 4.

FIG. 4 is a graph showing the relationship between the displacement of the soft magnetic material 12 and the magnetic flux density detected by the sensor 13.

Assuming that the stroke is 0.5 mm when the tip portion 11b of the needle 11 is in contact with the seam portion 10c of the injector body 10 (the state in FIG. 3C), the stroke further increases as the tip portion 11b of the needle 11 separates away from the seam portion 10c of the injector body 10. As shown in FIG. 4, the relationship between the displacement of the soft magnetic material 12 and the magnetic flux density detected by the sensor 13 is such that the magnetic flux density increases as the stroke increases positively, and the linearity (the dynamic range is 25 mT) is ensured within the stroke range of 0.5 to 1.5 mm.

Effects of First Embodiment

According to the above-described first embodiment, since the soft magnetic material 12 of the displacement detection device 2 is provided in the injector body 10 (flow path), and the other components (the sensor 13, magnets 14a and 14b, and yoke 15) are provided outside the injector body 10, the displacement of the needle 11 in the injector body 10 can be detected without changing the design of the injector body 10 or while suppressing the design change of the injector body 10.

Further, since it is not necessary to induce many magnetic fluxes, the soft magnetic material 12 does not need to be enlarged. As a result, an increase in the weight of the soft magnetic material 12 can be suppressed, and a decrease in the sensitivity to the displacement of the needle 11 connected to the soft magnetic material 12 due to increased weight can be suppressed.

In addition, since the magnetic field between the magnets 14a and 14b is made uniform and the magnetic flux passing through the soft magnetic material 12 is designed so as not to fluctuate greatly, the influence of hysteresis generated in the soft magnetic material 12 is small, and deterioration in accuracy can be suppressed as compared with the case where the configuration of the first embodiment is not employed.

Further, since the soft magnetic material 12 has a disk shape, displacement can be detected even when the needle 11 rotates. Therefore, the displacement of the needle 11 can be detected even when a screw mechanism that rotates the needle 11 at the time of displacement of the needle 11 or a motor for rotating the needle 11 is used instead of the solenoid as a configuration for displacing the needle 11. In addition, when MLX91208CAH is employed as the sensor 13, responsiveness of 3 μsec can be obtained under the above conditions.

Second Embodiment

The second embodiment is different from the first embodiment in that a magnet of a similar shape is used instead of the soft magnetic material 12 of the first embodiment, the magnet is displaced based on the displacement of the needle 11, and the displaced magnetic field is detected by the sensor. In the following description, similar reference numerals are used for the configurations common to the first embodiment.

Figure 5:
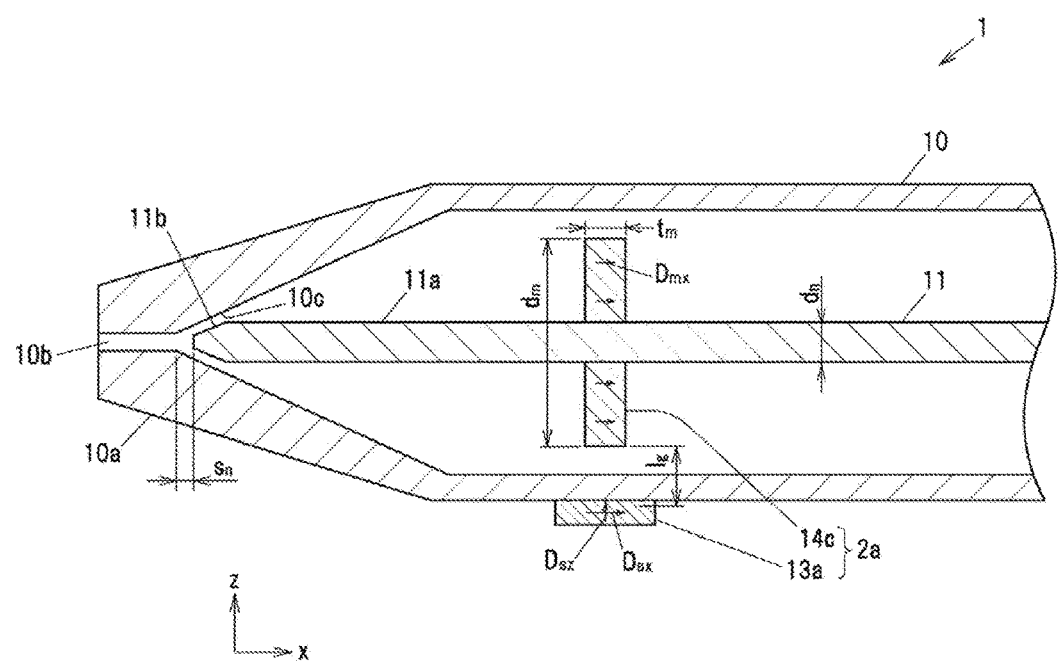
FIG. 5 is a perspective view showing a configuration example of a displacement detection device according to a second embodiment.

FIG. 5 is a perspective view showing a configuration example of the displacement detection device according to the second embodiment.

A displacement detection device 2a includes a magnet 14c magnetized in the magnetizing direction $D_{mx}$ and moving in the x-axis direction together with the needle 11 and a sensor 13a that detects a magnetic flux density varying based on the displacement of the magnet 14c in the detecting directions $D_{sx}$ and $D_{sz}$ and that outputs a voltage corresponding to the magnetic flux density. The output of the sensor 13a is relayed to an ECU (not shown) or the like, and the output value is used for feedback or the like for stroke control of the needle 11.

As shown in FIG. 14A, the sensor 13a is a Hall IC that has a flat plate shape having a thickness in the z direction, and has a detection surface parallel to the xy plane as an example for detecting magnetism in the detecting directions $D_{sx}$ and $D_{sz}$, by having at least the pair of Hall elements 130l and 130r of which the detecting direction is $D_{sz}$ as magnetic detection elements and a magnetic concentrator 131 provided on the pair of Hall elements 130l and 130r for converting the magnetic flux in the x direction into that in the z direction and allowing the Hall elements 130l and 130r to detect the magnetic flux. (for example, MLX90365 or the like can be used and an output proportional to the magnetic flux density in $D_{sx}$ can be obtained by procuring the difference between the outputs of the Hall elements 130l and 130r, and an output proportional to the magnetic flux density in the detecting direction $D_{sz}$ can be obtained by procuring the sum of the outputs of the Hall elements 130l and 130r). For the sensor 13a, if the detecting directions are $D_{sx}$ and $D_{sz}$, other types of elements such as MR elements may be used, or a multiaxial magnetism detection IC may be used in which the magnetic detection elements are arranged in a plurality of axial directions if the plurality of axial directions include the detecting directions $D_{sx}$ and $D_{sz}$.

The magnet 14c is a flat plate having a thickness in the x direction, and is a permanent magnet formed using a material such as ferrite, samarium cobalt, neodymium.

Further, as the needle 11 moves, the magnet 14c displaces in the x direction in accordance with the displacement. In addition, the displacement amount $s_n$ is set as a minute displacement of about several millimeters (for example, ±0.5 mm).

The size of the injector 1 is as follows as an example, but can be changed according to the design as appropriate. The outer shape of the injector body 10 is 16 mm, the inner diameter is 12 mm, and the diameter of the nozzle hole 10b is 1 mm. The diameter dn of the needle is 3 mm and the stroke $s_n$ is ±0.5 mm.

Further, the size of the displacement detection device 2a is as follows as an example, but can be appropriately changed according to the design. The thickness $t_s$ of the magnet 14c is 0.5 mm, the diameter $d_s$ is 10 mm, and the air gap $l_g$ between the magnet 14c and the detection surface of the sensor 13a is 1.5 mm.

(Operation of Displacement Detection Device)

Next, the operation of the second embodiment will be described with reference to FIGS. 5 to 7A and 7B.

Figure 6A:
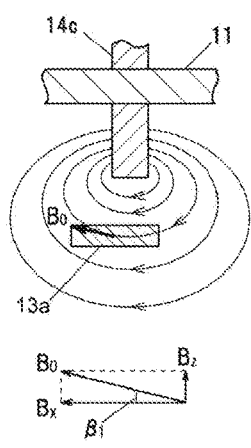
FIG. 6A is a schematic diagram for illustrating an operation of the displacement detection device.
Figure 6B:
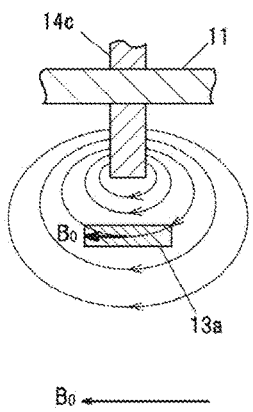
FIG. 6B is a schematic diagram for illustrating the operation of the displacement detection device.
Figure 6C:
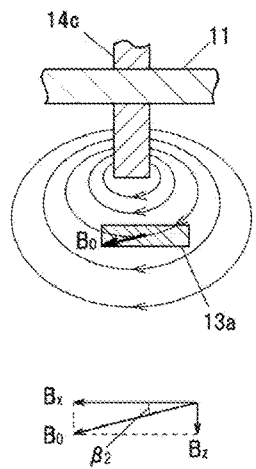
FIG. 6C is a schematic diagram for illustrating the operation of the displacement detection device.

FIGS. 6A to 6C are schematic diagrams for illustrating the operation of the displacement detection device 2a.

When the needle 11 is displaced in the positive direction of the x direction in order to eject the fuel from the nozzle hole 10b, the magnet 14c is displaced in the same manner, and the magnetic flux densities $B_x$ and $B_z$ in the detecting directions $D_{sx}$ and $D_{sz}$ of the magnetic flux density B passing through the Hall element of the sensor 13a have a negative value satisfying $B_x=B_0 \cdot \cos \beta_1 < 0$, and a positive value satisfying $B_z=B_0 \cdot \sin \beta_1 > 0$ respectively as shown in FIG. 6A, assuming that an angle between the x direction and the magnetic flux is $\beta_1$.

Next, when the needle 11 is displaced in the negative direction of the x direction in order to suppress the amount of fuel injected from the nozzle hole 10b from the state shown in FIG. 6A, the sensor 13a and the magnet 14c come closest to each other at a certain point, as shown in FIG. 6B. In this state, the magnetic flux densities in the detecting directions $D_{sx}$ and $D_{sz}$ of the magnetic flux density B passing through the Hall element of the sensor 13a satisfy $B_x=B_0 \cdot \cos 0°=B_0$ and $B_z=B_0 \cdot \sin 0°=0$ respectively.

Next, when the needle 11 is displaced in the negative direction of the x direction in order to prevent fuel from being ejected from the nozzle hole 10b from the state shown in FIG. 6B, the magnetic flux densities $B_x$ and $B_z$ in the detecting directions $D_{sx}$ and $D_{sz}$ of the magnetic flux density B penetrating the Hall element of the sensor 13a have a negative value satisfying $B_x=B_0 \cdot \cos \beta_2 < 0$, and a negative value satisfying $B_z=B_0 \cdot \sin \beta_2 < 0$ respectively, assuming that the angle between the x direction and the magnetic flux is $\beta_2$ as shown in FIG. 6C.

Figure 7A:
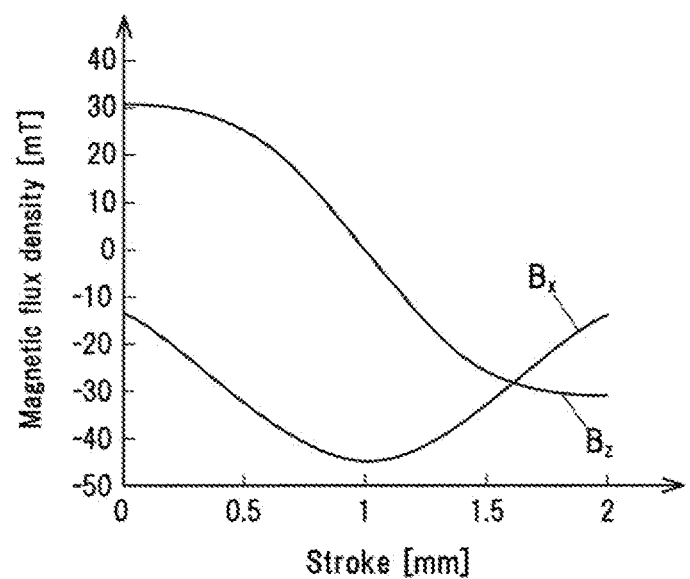
FIG. 7A is a graph showing a relationship between a displacement of a magnet and the detected magnetic flux density and a relationship between the displacement of the magnet and an output of the sensor.

The relationship between the displacement of these magnets 14c and the magnetic flux density detected by the sensor 13a is represented as shown in FIG. 7A described below. Further, the output of the sensor 13a represented by arctan $(B_x/B_z)$ is generated, and the relationship between the displacement of the magnet 14c and the output of the sensor 13a is represented as shown in FIG. 7B.

Figure 7B:
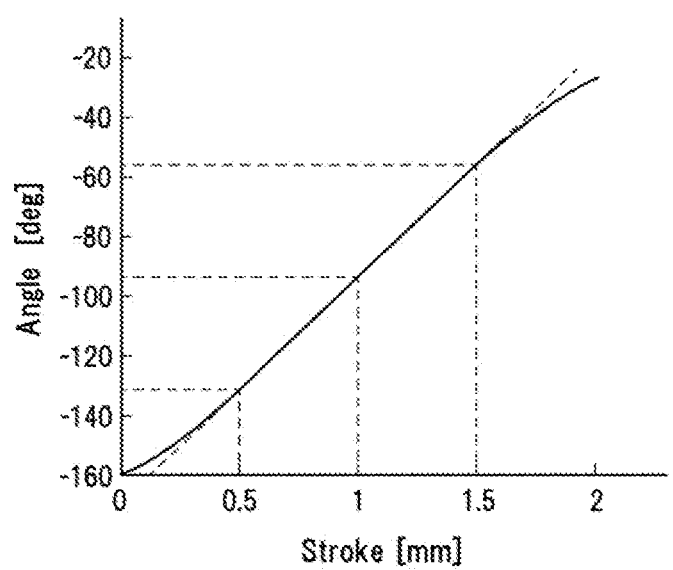
FIG. 7B is a graph showing the relationship between the displacement of the magnet and the detected magnetic flux density and the relationship between the displacement of the magnet and the output of the sensor.

FIGS. 7A and 7B are graphs showing the relationship between the displacement of the magnet 14c and the magnetic flux density detected by the sensor 13a and the relationship between the displacement of the magnet 14c and the output of the sensor 13a.

Assuming that the stroke is 0.5 mm when the tip portion 11b of the needle 11 is in contact with the seam portion 10c of the injector body 10 (the state of FIG. 6C), the stroke further increases as the tip portion 11b of the needle 11 separates away from the seam portion 10c of the injector body 10. The relationship between the displacement of the magnet 14c and the magnetic flux densities in the two directions ($D_{sx}$ and $D_{sz}$) that are detected by the sensor 13a is shown in FIG. 7A. Further, the relationship between the displacement of the magnet 14c and the output of the sensor 13a is such that the magnetic flux density increases as the stroke increases positively and the linearity (dynamic range is 80 deg) is secured when the stroke is between 0.5 and 1.5 mm as shown in FIG. 7B.

Effects of Second Embodiment

According to the second embodiment described above, since the arrangement is only disposing the sensor 13a outside the injector body 10, the degree of freedom of design or arrangement of the injector body 10 is improved in addition to the effect of the first embodiment.

In addition, when MLX90365 is adopted as the sensor 13a, responsiveness of 3 μsec can be obtained under the above conditions.

Third Embodiment

The third embodiment is different from the first embodiment in that two soft magnetic materials are provided and the arrangement of the sensor is different.

Figure 8:
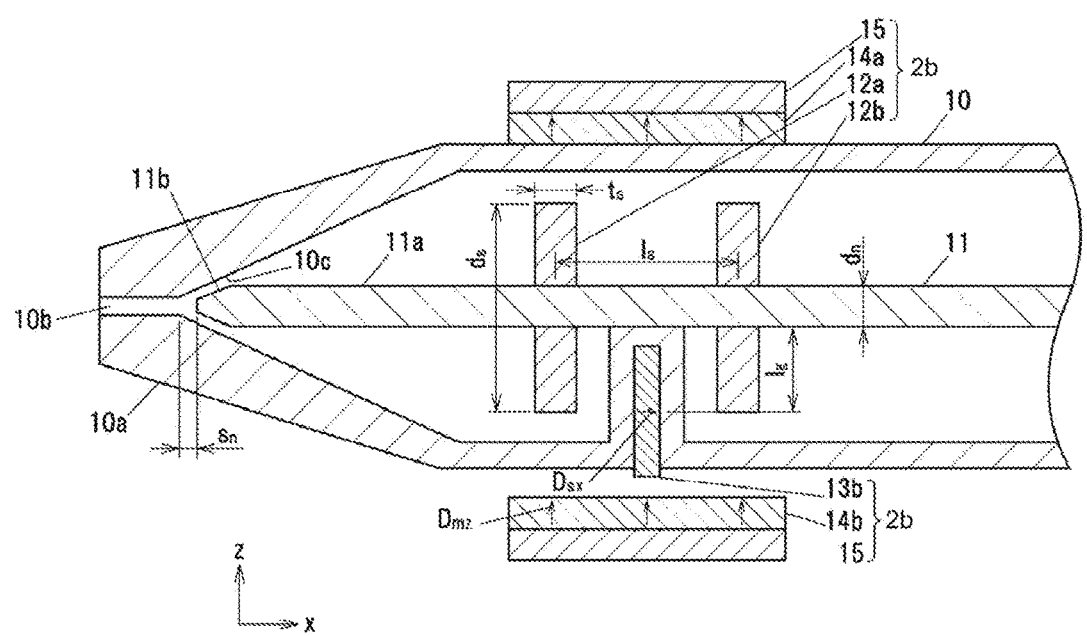
FIG. 8 is a perspective view showing a configuration example of a displacement detection device according to a third embodiment.

FIG. 8 is a perspective view showing a configuration example of the displacement detection device according to the third embodiment.

A displacement detection device 2b includes soft magnetic materials 12a and 12b which move together with the needle 11 in the x-axis direction, a sensor 13b that detects a magnetic flux density which changes based on the displacement of the soft magnetic materials 12a and 12b in the detecting direction $D_{sx}$ and outputs voltage corresponding to the magnetic flux density, the pair of magnets 14a and 14b magnetized in a magnetizing direction $D_{mz}$ orthogonal to the detecting direction $D_{sx}$ and disposed so that the injector body 10 is sandwiched between the pair of magnets 14a and 14b, and the yoke 15 provided to form a uniform magnetic field between the magnets 14a and 14b. The output of the sensor 13b is relayed to an ECU (not shown) or the like, and the output value is used for feedback or the like for stroke control of the needle 11.

Figure 14B:
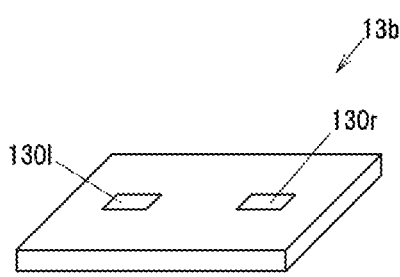
FIG. 14B is a perspective view showing a configuration example of the sensor.

As shown in FIG. 14B, the sensor 13b is a Hall IC that has a flat plate shape having a thickness in the x direction and a detection surface parallel to the yz plane for detecting magnetism in the detecting direction $D_{sx}$, by having Hall elements 130l and 130r (may have one of them) of which the detecting direction is $D_{sx}$ as the magnetic detection element (for example, MLX91209 or the like can be used). For the sensor, if the detecting direction is $D_{sx}$, another type of element such as an MR element may be used, or a multiaxial magnetism detection IC may be used in which magnetic detection elements are arranged in a plurality of axial directions if the plurality of axial directions include the detecting direction $D_{sx}$.

The soft magnetic materials 12a and 12b are flat plates using a soft magnetic material such as iron having a thickness in the x direction and are disposed between the pair of magnets 14a and 14b and displaced within such a range that the magnetic flux induced by the soft magnetic materials 12a and 12b is detected by the sensor 13b. In addition, the same soft magnetic material as the soft magnetic materials 12a and 12b may be used for the needle 11.

In addition, as the needle 11 moves, the soft magnetic materials 12a and 12b are displaced in the x direction in accordance with the displacement. The displacement amount $s_n$ is set as a minute displacement of about several millimeters (for example, ±0.5 mm). The soft magnetic materials 12a and 12b may be formed integrally with the needle 11.

The pair of magnets 14a and 14b are permanent magnets formed using materials such as ferrite, samarium cobalt, neodymium, and form a uniform magnetic field at least in the movable range of the soft magnetic materials 12a and 12b. The magnetic flux induced by the soft magnetic materials 12a and 12b does not fluctuate toward the plus and minus sides or the numerical value does not change significantly so as to cause influence of hysteresis. As an example, the fluctuation width of the magnetic flux density induced by the soft magnetic materials 12a and 12b is about ±10 mT.

For the yoke 15, iron can be used for example, and other soft magnetic material such as permalloy can be used. It should be noted that the yoke 15 may be omitted when the conditions can be satisfied only with the magnets 14a and 14b. For the injector body 10, stainless steel can be used and a non-magnetic material such as aluminum or brass can be used for example.

The size of the injector 1 is as follows as an example, but can be changed in accordance with the design as appropriate. The outer shape of the injector body 10 is 16 mm, the inner diameter is 12 mm, and the diameter of the nozzle hole 10b is 1 mm. The diameter $d_n$ of the needle is 3 mm and the stroke $s_n$ is ±0.5 mm.

In addition, the size of the displacement detection device 2b is as follows as an example, but can be changed according to the design as appropriate. The thickness $t_s$ of each soft magnetic materials 12a and 12b is 1 mm, the diameter $d_s$ is 7 mm, the interval $I_s$ is 4 mm, and the air gap $l_g$ between the soft magnetic materials 12a and 12b and the detection surface of the sensor 13b is 3 mm. The width of magnets 14a and 14b in the x direction is 20 mm, the depth in the y direction is 5 mm, and the thickness in the z direction is 5 mm. The size of the yoke 15 is provided so as to cover at least the magnets 14a and 14b, the width in the x direction is 20 mm, the depth in the y direction is 17 mm, the thickness in the z direction is 2 mm, and the interval in the z direction is 27 mm.

(Operation of Displacement Detection Device)

Next, the operation of the third embodiment will be described with reference to FIGS. 8 to 10.

FIGS. 9A to 9C are schematic diagrams for illustrating the operation of the displacement detection device 2.

When the needle 11 is displaced in the positive direction of the x direction in order to eject the fuel from the nozzle hole 10b, the soft magnetic materials 12a and 12b are displaced in the same manner, and as shown in FIG. 9A, the magnetic flux density $B_x$ in the detecting direction $D_{sx}$ of the magnetic flux density B penetrating the Hall element of the sensor 13b has a negative value satisfying $B_x=B_0 \cdot \cos \gamma_1 < 0$, assuming that the angle between the x direction and the magnetic flux is $\gamma_1$.

Next, when the needle 11 is displaced in the negative direction of the x direction in order to suppress the amount of fuel injected from the nozzle hole 10b from the state shown in FIG. 9A, the sensor 13b and the soft magnetic materials 12a and 12b are equally spaced from each other at a certain point, as shown in FIG. 9B. In this state, the magnetic flux density in the detecting direction $D_{sx}$ of the magnetic flux density B passing through the Hall element of the sensor 13b satisfies $B_x=B_0 \cdot \cos 90° = 0$.

Next, when the needle 11 is displaced in the negative direction of the x direction in order to prevent fuel from being ejected from the nozzle hole 10b from the state shown in FIG. 9B, the magnetic flux density $B_x$ in the detecting direction $D_{sx}$ of the magnetic flux density B penetrating the Hall element of the sensor 13b has a positive value satisfying $B_x=B_0 \cdot \cos \alpha_2 > 0$, assuming that the angle formed by the x direction and the magnetic flux is $\gamma_2$ as shown in FIG. 9C.

Figure 10:
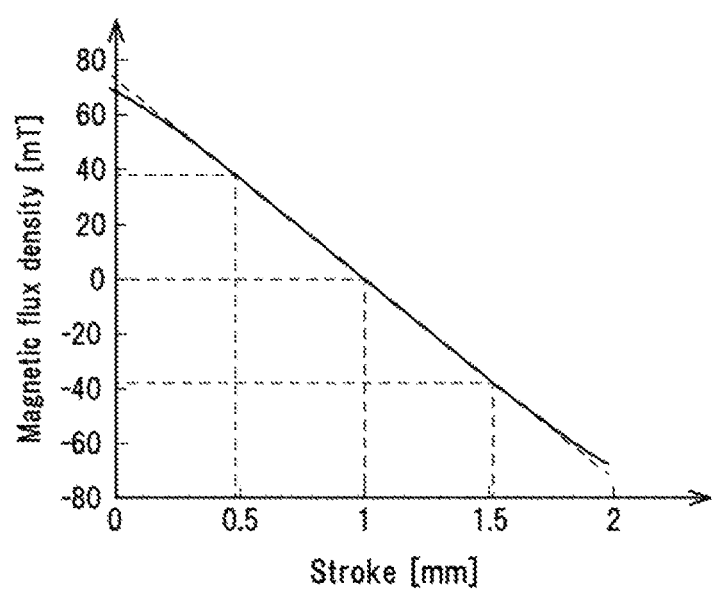
FIG. 10 is a graph showing a relationship between the displacement of the soft magnetic material and the magnetic flux density detected by the sensor.

The relationship between the displacement of these soft magnetic materials 12a and 12b and the magnetic flux density detected by the sensor 13b is represented as shown in FIG. 10 described below. Since the magnetic flux density detected by the sensor 13b is proportional to the output of the sensor 13b, the relationship between the displacement of the soft magnetic materials 12a and 12b and the output of the sensor 13b is also similar to in FIG. 10.

FIG. 10 is a graph showing the relationship between the displacement of the soft magnetic materials 12a and 12b and the magnetic flux density detected by the sensor 13b.

When the stroke is assumed to be 0.5 mm in a state where the tip portion 11b of the needle 11 is in contact with the seam portion 10c of the injector body 10 (the state in FIG. 9C), the stroke further increases as the tip portion 11b of the needle 11 separates away from the seam portion 10c of the injector body 10. The relationship between the displacement of the soft magnetic materials 12a and 12b and the magnetic flux density detected by the sensor 13b is such that the magnetic flux density decreases as the stroke increases positively, and the linearity (dynamic range is 80 mT) is ensured in the stroke range between 0.5 to 1.5 mm as shown in FIG. 10.

Effects of Third Embodiment

According to the third embodiment described above, it is necessary to change the design of the injector body 10 from the first embodiment, but since the distance between the soft magnetic materials 12a and 12b and the sensor 13b is reduced, a larger dynamic range can be achieved.

Also, since it is not necessary to induce many magnetic fluxes, the soft magnetic materials 12a and 12b do not need to be to enlarged, and as a result, an increase in weight of the soft magnetic materials 12a and 12b can be suppressed and a decrease in the sensitivity to the displacement of the needle 11 connected to the soft magnetic materials 12a and 12b due to increased weight can be suppressed.

In addition, since the magnetic field between the magnets 14a and 14b is made uniform and the magnetic flux passing through the soft magnetic materials 12a and 12b is designed to have no great fluctuation, only small influence of hysteresis occurs in the soft magnetic materials 12a and 12b, and therefore the accuracy drop can be suppressed as compared with the case where the configuration of the third embodiment is not employed.

Further, since the soft magnetic materials 12a and 12b are formed in a disk shape, the displacement can be detected even when the needle 11 rotates. In addition, when MLX91209 is adopted as the sensor 13, responsiveness of 3 μsec is obtained under the above conditions.

In the case where the needle 11 and the soft magnetic materials 12a and 12b are integrally formed, they may be formed as follows.

Figure 11A:
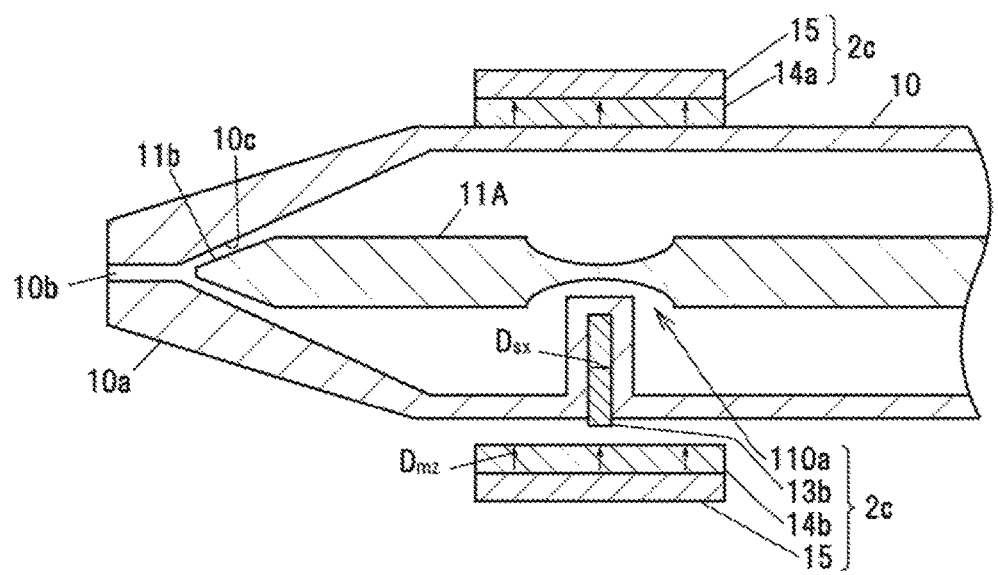
FIG. 11A is a cross-sectional view showing a modification example of a needle.
Figure 11B:
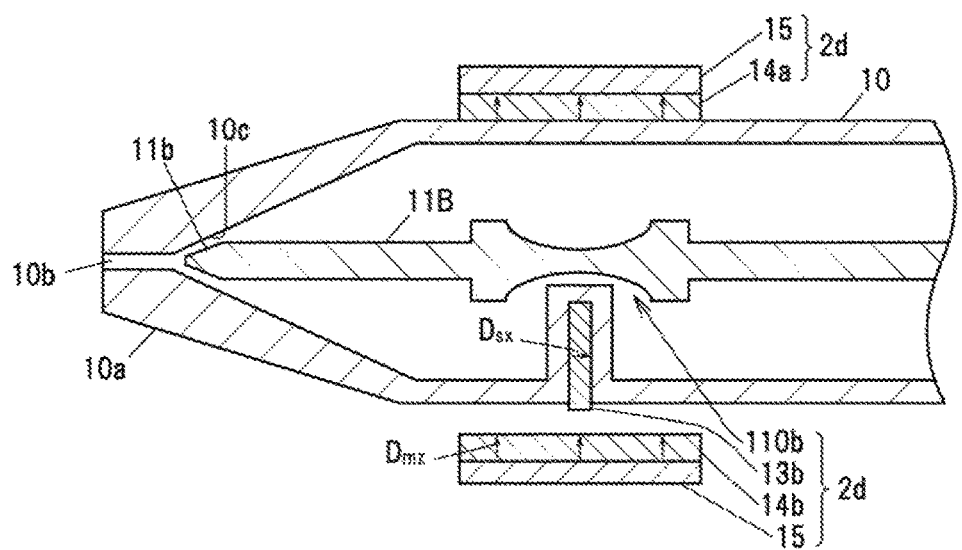
FIG. 11B is a cross-sectional view showing a modification example of the needle.

FIGS. 11A and 11B are cross-sectional views showing modification examples of the needle.

As shown in FIG. 11A, the needle 11a is formed using a soft magnetic material and has a depressed shape 110a for inducing a magnetic flux similarly to the above soft magnetic materials 12a and 12b.

Further, as shown in FIG. 11B, the needle 11b is formed using a soft magnetic material and has a bobbin shape 110b for inducing a magnetic flux similarly to the above soft magnetic materials 12a and 12b.

Displacement detection devices 2c and 2d using the depressed shape 110a and the bobbin shape 110b respectively have similar effects to those of the above third embodiment.

Another Embodiment

It should be noted that the present invention is not limited to the above embodiments, and various modifications are possible without departing from the spirit of the present invention. In the above embodiments, the displacement detection device is used as a lift sensor of a needle in an injector; however the application object is not limited to the injector but the embodiments can be applied similarly to a device structured by having an inside and an outside of the body and minute displacement. Other devices can include a device for detecting oil pressure in a hydraulic cylinder by distortion (minute displacement), a device for detecting pressure in a casing filled with corrosive gas or liquid by distortion (minute displacement) and a device for detecting pressure in a highly airtight casing by distortion (minute displacement). In any case, displacement can be detected without contact.

In addition, the combinations of the sensor, the soft magnetic material, and the magnet according to the first to third embodiments described above are examples, and as long as the function of detecting positions is not impaired and the gist of the present invention is not changed, the combinations may be appropriately selected and changed to new combinations for use. Further, a soft magnetic material having the following shape may be used.

Figure 12A:
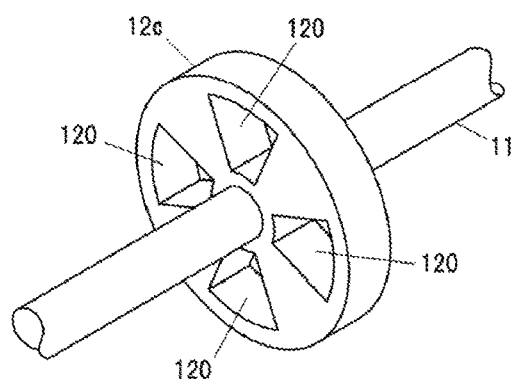
FIG. 12A is a perspective view showing a modification example of the shape of a soft magnetic material.
Figure 12B:
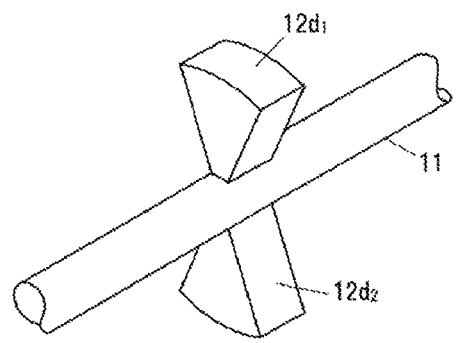
FIG. 12B is a perspective view showing a modification example of the shape of the soft magnetic material.

FIGS. 12A and 12B are perspective views showing modification examples of the shape of the soft magnetic material.

As shown in FIG. 12A, a soft magnetic material 12c has a diameter and a thickness similar to those of the soft magnetic material 12, and further has holes 120 serving as a fuel flow path. By providing the holes 120, the fuel can be made to flow smoothly as compared with a case where the holes 120 are not provided. Further, since the flow path of the fuel can be secured, the diameter of the soft magnetic material 12c can be made larger.

As shown in FIG. 12B, a soft magnetic material 12d has a similar diameter and thickness to those of the soft magnetic material 12, and has a shape leaving parts of the circumference so as to be opposed to each other. It should be noted that the soft magnetic material 12d is arranged so that one of the opposed pieces comes closest to the sensor. By adopting this shape, it is possible to make the fuel flow more smoothly as compared with the case of the above-described holes 120. Further, since the fuel flowpath can be secured, the diameter of the soft magnetic material 12d can be increased.

In addition, a magnet having the shape shown below may be used.

Figure 13:
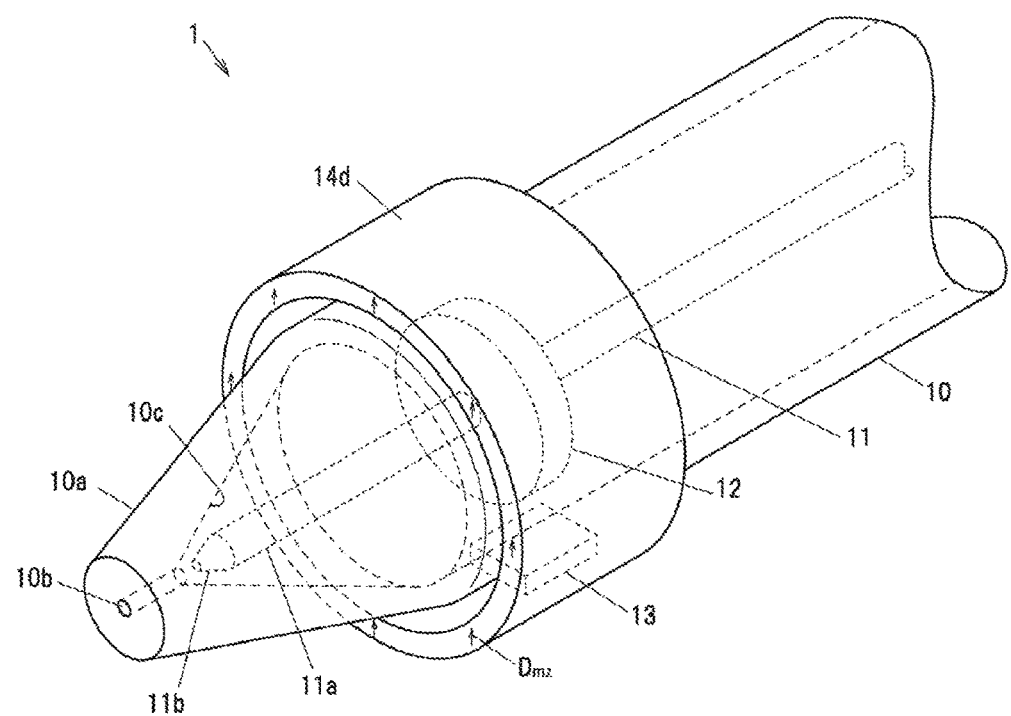
FIG. 13 is a schematic diagram showing a configuration of a modification example of the magnet.

FIG. 13 is a schematic view showing a configuration of a modification of the magnet.

A displacement detection device 2e is obtained by replacing the magnets 14a and 14b and the yoke 15 of the displacement detection device 2 of the first embodiment with a magnet 14d.

The magnet 14d has a cylindrical shape and has an inner diameter that allows the injector body 10 and the sensor 13 to be arranged inside and is magnetized in the magnetizing direction Dmz.

In addition, the magnet 14d is a permanent magnet formed using a material such as ferrite, samarium cobalt, neodymium, and forms a uniform magnetic field at least in the movable range of the soft magnetic material 12, and the magnetic flux induced by the soft magnetic material 12 does not fluctuate toward the plus and minus sides or the numerical value does not change significantly so as to cause influence of hysteresis. As an example, the fluctuation width of the magnetic flux density induced by the soft magnetic material 12 is set to about ±10 mT.

In addition, the following sensors may be used.

Figure 14C:
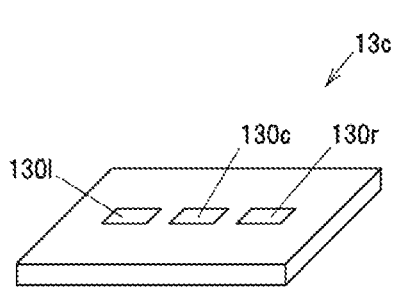
FIG. 14C is a perspective view showing a configuration example of the sensor.
Figure 14D:
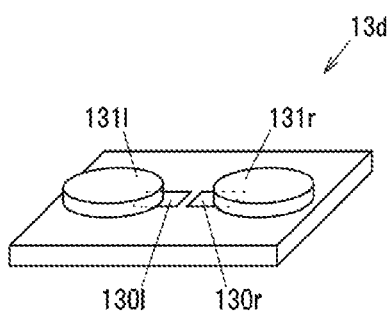
FIG. 14D is a perspective view showing a configuration example of the sensor.

As shown in FIG. 14C, a sensor 13c has Hall elements 130l, 130r, and 130c arranged in a row. By procuring the difference between the outputs of the Hall elements 130l and 130r and the value of arc tangent with the output of the Hall element 130c, similar output to in the second embodiment can be obtained.

Further, the difference between the outputs of the Hall elements 130l and 130r is obtained and then the outputs of the Hall elements 130l and 130r are averaged in other processing. Since the average of the outputs of the Hall elements 130l and 130r is similar to the output of the Hall element 130c, the output similar to that in the second embodiment can be obtained.

INDUSTRIAL APPLICABILITY

Provided is a displacement detection device for detecting a displacement of a measuring object housed in a casing without changing the design of the casing or while suppressing the design change.

REFERENCE SIGNS LIST

1: injector
2, 2a, 2b, 2c: displacement detection device
10: injector body
10a: nozzle portion
10b: nozzle hole
10c: seam portion
11, 11A, 11B: needle
11a: columnar portion
11b: tip portion
12, 12a, 12b, 12c, 12d: soft magnetic material
13, 13a, 13b: sensor
14a, 14b, 14c: magnet
15: yoke
110a: depressed shape
110b: bobbin shape
120: hole

The invention claimed is:

1. A displacement detection device comprising:
a casing configured to allow a flow of liquid or gas inside the casing;
a measuring object inside the casing configured to displace in accordance with the flow of liquid or gas;
a soft magnetic material connected to the measuring object inside the casing and configured to displace in accordance with displacement of the measuring object;
at least one magnet located outside the casing and configured to form a uniform magnetic field in a direction perpendicular to a displacement direction of the measuring object in a range of the displacement of the soft magnetic material in the casing;
a sensor disposed outside the casing and in the uniform magnetic field and configured to detect an amount of a horizontal element of a magnetic flux density that is parallel to the displacement direction of the measuring object and corresponding to a position of the soft magnetic material displaced within a displacement range of the soft magnetic material, wherein
the sensor is configured to output a signal proportional to the amount of the detected horizontal element of the magnetic flux density.

2. The displacement detection device according to claim 1, wherein the casing is made of a non-magnetic material.

3. The displacement detection device according to claim 2, wherein the soft magnetic material has a disk shape of which a cross-sectional shape in a cross section perpendicular to the displacement direction of the measuring object is circular.

4. The displacement detection device according to claim 2, wherein the soft magnetic material has at least one through-hole configured to pass the flow of liquid or gas.

5. The displacement detection device according to claim 2, wherein the soft magnetic material is integrally formed with the measuring object and has a shape that induces a magnetic flux of the at least one magnet.

6. The displacement detection device according to claim 2, wherein the soft magnetic material is configured to displace in a manner that a magnetic flux density passing through the soft magnetic material does not change.

7. The displacement detection device according to claim 1, wherein the soft magnetic material has a disk shape of which a cross-sectional shape in a cross section perpendicular to the displacement direction of the measuring object is circular.

8. The displacement detection device according to claim 7, wherein the soft magnetic material has at least one through-hole configured to pass the flow of liquid or gas.

9. The displacement detection device according to claim 1, wherein the soft magnetic material has at least one through-hole configured to pass the flow of liquid or gas.

10. The displacement detection device according to claim 1, wherein the soft magnetic material is integrally formed with the measuring object and has a shape that induces a magnetic flux of the at least one magnet.

11. The displacement detection device according to claim 10, wherein the shape is a bobbin-shape with flanges and the sensor is positioned in-between the flanges.

12. The displacement detection device according to claim 1, wherein the sensor comprises at least a pair of Hall elements and at least one magnetic concentrator on the pair of the Hall elements that converts a direction of the horizontal element of the magnetic flux density to the direction perpendicular to the displacement direction.

13. The displacement detection device according to claim 12, wherein the sensor outputs the signal proportional to the amount of the detected horizontal element of the magnetic flux density by subtracting one output from another output obtained from the pair of the Hall elements.

14. The displacement detection device according to claim 1, further comprises a yoke attached to the at least one magnet.

15. The displacement detection device according to claim 1, wherein the at least one magnet is a cylindrical cuff-shaped magnet disposed around an outer periphery of the casing.

16. The displacement detection device according to claim 1, the at least one magnet is a pair of magnets disposed to sandwich the sensor and the casing from outside the casing and is configured to form the uniform magnetic field in-between the pair of the magnets in the direction perpendicular to the displacement direction of the measuring object.

17. The displacement detection device according to claim 1, wherein the soft magnetic material is configured to displace in a manner that a magnetic flux density passing through the soft magnetic material does not change.

18. The displacement detection device according to claim 1, wherein the measuring object is a needle of an injector, and the casing is a body of the injector.

19. A displacement detection device comprising:
a casing configured to allow a flow of liquid or gas inside the casing;
a measuring object inside the casing configured to displace in a longitudinal direction of the casing in accordance with the flow of liquid or gas;
a soft magnetic material connected to the measuring object inside the casing and configured to displace in accordance with a displacement of the measuring object;
a sensor disposed outside the casing;
a pair of magnets disposed outside the casing in a manner that sandwiches the casing and the sensor between the pair of magnets so as that the pair of magnets forms a uniform magnetic field in a direction perpendicular to the longitudinal direction in a displacement range of the soft magnetic material, wherein
the sensor is configured to detect an amount of a horizontal element of a magnetic flux density that is parallel to the longitudinal direction and corresponding to a position of the soft magnetic material displaced within a displacement range of the soft magnetic material,
the amount of the detected horizontal element of the magnetic flux density includes zero; and
the sensor is configured to output a signal proportional to the amount of the detected horizontal element of the magnetic flux density.

20. A displacement detection device comprising:
a casing configured to allow a flow of liquid or gas inside the casing;
a measuring object inside the casing configured to displace in a longitudinal direction of the casing in accordance with the flow of liquid or gas;
a pair of soft magnetic materials connected to the measuring object inside the casing and configured to displace in accordance with a displacement of the measuring object;
a sensor disposed outside the casing and positioned in-between the pair of soft magnetic materials;
a pair of magnets disposed outside the casing in a manner that sandwiches the casing and the sensor between the pair of magnets so as that the pair of magnets forms a uniform magnetic field in a direction perpendicular to the longitudinal direction in a displacement range of the pair of soft magnetic materials, wherein
the sensor is configured to detect an amount of a horizontal element of a magnetic flux density that is parallel to the longitudinal direction and corresponding to a position of the pair of soft magnetic materials displaced within a displacement range of the pair of soft magnetic materials, and
the sensor is configured to output a signal proportional to the amount of the detected horizontal element of the magnetic flux density.

* * * * *